United States Patent [19]

Tokugawa

[11] Patent Number: 4,729,602
[45] Date of Patent: Mar. 8, 1988

[54] SEAT BELT ANCHOR MECHANISM
[75] Inventor: Osamu Tokugawa, Kanagawa, Japan
[73] Assignee: NSK Warner K.K., Tokyo, Japan
[21] Appl. No.: 888,018
[22] Filed: Jul. 22, 1986
[30] Foreign Application Priority Data Jul. 31, 1985 [JP] Japan .................. 60-116396[U]

[51] Int. Cl.[4] .............................................. A62B 35/00
[52] U.S. Cl. ..................................... 297/468; 297/473
[58] Field of Search ............... 297/468, 469, 473, 482, 297/483, 386, 216

[56] References Cited

U.S. PATENT DOCUMENTS

| 3,186,760 | 6/1965 | Lohr et al. | 297/216 |
|---|---|---|---|
| 3,424,494 | 1/1969 | McIntyre et al. | 297/468 |
| 3,727,977 | 4/1973 | Gmeiner | 297/468 X |
| 3,746,393 | 7/1973 | Andres et al. | 297/385 |
| 3,845,987 | 11/1974 | Bashford | 297/468 |
| 4,042,276 | 8/1977 | Breitschwerdt | 297/468 X |
| 4,159,848 | 7/1979 | Manz et al. | 297/483 X |
| 4,248,480 | 2/1981 | Koucky et al. | 297/473 |
| 4,262,963 | 4/1981 | Bauer et al. | 297/468 X |
| 4,316,633 | 2/1982 | Zaccariotto | 297/468 X |
| 4,482,188 | 11/1984 | Tilly et al. | 297/468 X |
| 4,508,386 | 4/1985 | Hofman | 297/473 X |
| 4,616,875 | 10/1986 | McFalls et al. | 297/366 X |

FOREIGN PATENT DOCUMENTS

| 2634218 | 2/1978 | Fed. Rep. of Germany | 297/468 |
|---|---|---|---|
| 2802616 | 7/1979 | Fed. Rep. of Germany | 297/468 |
| 2802617 | 7/1979 | Fed. Rep. of Germany | 297/473 |
| 2803896 | 8/1979 | Fed. Rep. of Germany | 297/473 |
| 2820589 | 11/1979 | Fed. Rep. of Germany | 297/473 |
| 2747933C3 | 4/1980 | Fed. Rep. of Germany | |
| 2853438A1 | 6/1980 | Fed. Rep. of Germany | |
| 2634218C3 | 6/1982 | Fed. Rep. of Germany | |
| 2742668C2 | 11/1982 | Fed. Rep. of Germany | |
| 2400898C2 | 6/1983 | Fed. Rep. of Germany | |
| 35500 | 8/1982 | Japan | |
| 14293 | 4/1984 | Japan | |
| 2084002 | 4/1982 | United Kingdom | 297/468 |

OTHER PUBLICATIONS

Osamu Tokugawa et al., Ser. No. 783,122, filed 10/02/85.
Osamu Tokugawa, Ser. No. 780,999, filed 09/27/85.

Primary Examiner—Kenneth J. Dorner
Assistant Examiner—José V. Chen
Attorney, Agent, or Firm—Wegner & Bretschneider

[57] ABSTRACT

A seat belt anchor mechanism includes an anchor stay defining interlocking teeth, a base plate displaceable together with an associated vehicle seat along the anchor stay, an interlocking means fixed on the base plate for engagement with any one of the interlocking teeth in the event of an emergency, means for mounting the base plate on the seat in such a way that the interlocking means is displaceable in a direction which crosses the sliding direction of the seat, and a cover member displaceable between a normal position and an emergency position. In the normal position, at least a part of the cover member is interposed between the anchor stay and the interlocking means so as prevent the interlocking means from engaging any one of the interlocking teeth. In the emergency position, said at least a part of the cover member is retreated from the space between the anchor stay and the interlocking means so as to allow the interlocking means to engage any one of the interlocking teeth.

8 Claims, 3 Drawing Figures

SEAT BELT ANCHOR MECHANISM

BACKGROUND OF THE INVENTION

(1) Field of the Invention

This invention relates to a seat belt anchor mechanism suitable for use with an occupant-restraining seat belt system so that the anchor mechanism serves to transmit the tensile force of an associated webbing to the side of the body of an associated vehicle in the event of an emergency where a tensile load of at least a predetermined value is applied to the webbing and the anchor mechanism normally allows the webbing and an associated buckle to move together with an associated seat when the seat is slid in the longitudinal direction of the vehicle.

(2) Description of the Prior Art

There have generally been known seat belt anchor mechanisms equipped individually with an anchor stay defining a plurality of interlocking teeth, fixed on the side of an associated vehicle and having an elongated shape, a base plate displaceable as a unitary member together with an associated seat along the anchor stay when the seat is slid back and forth and fastened to an associated occupant-restraining webbing, and an interlocking means fixed on the base plate for engagement with any one of the interlocking teeth in the event of an emergency. In such conventional mechanisms, a structure is incorporated that the interlocking teeth and the interlocking means such as a pin are arranged with an interval therebetween in order to normally maintain the interlocking teeth and interlocking means out of engagement. Therefore, the interlocking means is always exposed. Accordingly, the interlocking teeth of the anchor stay and the interlocking means such as a pin tend to engage with each other when the individual parts of the seat belt anchor mechanism are mounted on its associated vehicle and seat, and the efficiency of their mounting work is impaired.

When some deviations are involved in the dimensions of the individual parts or their mounting, there is a danger that the interlocking teeth and interlocking means are rendered unreleasable and remain in an engaged state from the beginning.

SUMMARY OF THE INVENTION

An object of this invention is to overcome the above-mentioned problems and to provide a seat belt anchor mechanism which can achieve excellent work efficiency upon its mounting and can prevent the interlocking teeth and interlocking means from being brought into mutual engagement at the beginning even if some deviations are involved in its dimensions or mounting.

In order to attain the above object, the present invention provides a seat belt anchor mechanism which comprises:

an anchor stay defining a plurality of interlocking teeth and adapted to be fixed on the side of the body of a vehicle;

a base plate displaceable as a unitary member together with an associated seat of the vehicle along the anchor stay when the associated seat is slid back and forth, said base plate being fastened to an associated occupant-restraining webbing;

an interlocking means fixed on the base plate for engagement with any one of the interlocking teeth in the event of an emergency;

means for mounting the base plate on the seat in such a way that the interlocking means is displaceable in a direction which crosses the sliding direction of the seat; and a cover member displaceable between a first position which the cover member assumes normally and a second position which the cover member assumes in the event of an emergency that a tensile load of at least a predetermined value is applied from the webbing by way of the base plate, at least a part of said cover member being interposed between the anchor stay and the interlocking means so as prevent the interlocking means from engaging any one of the interlocking teeth while the cover member assumes the first position, and when the cover member assumes the second position, said at least a part of said cover member being retreated from the space between the anchor stay and the interlocking means so as to allow the interlocking means to engage any one of the interlocking teeth.

Since the interlocking means is normally maintained in the first position to avoid its engagement with any one of the interlocking teeth, the efficiency of its mounting work has been improved significantly.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
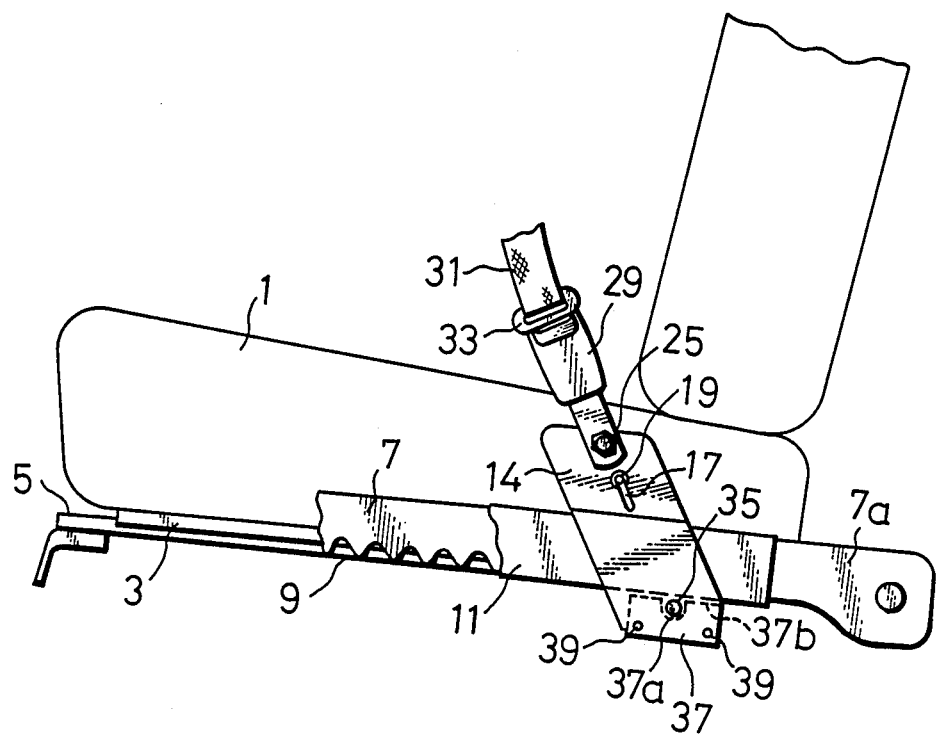
FIG. 1 is a front view of a seat belt anchor mechanism according to the first embodiment of this invention.

Referring first to FIG. 1 in which the first embodiment of this invention as viewed from the front is illustrated, a seat 1 is mounted on the floor of the body of a vehicle slidably in the longitudinal direction of the vehicle by way of an upper rail 3 fixedly provided as a unitary member on the seat 1 and a lower rail 5 fixed on the floor of the body of the vehicle.

An anchor stay 7 which is fixed at one end 7a thereof on the side of the body of the vehicle is provided along the inner side wall of the seat 1. A portion of the anchor stay 7 in which a plurality of interlocking teeth 9 are formed extends substantially in parallel with the slide rail 3 and in the longitudinal direction of the vehicle. A thin-walled resin cover 11 is applied over the teeth-defining portion of the anchor stay 7 so as to improve the appearance and at the same time to prevent the interlocking teeth 9 from hooking on the clothing of the occupant.

Figure 2:
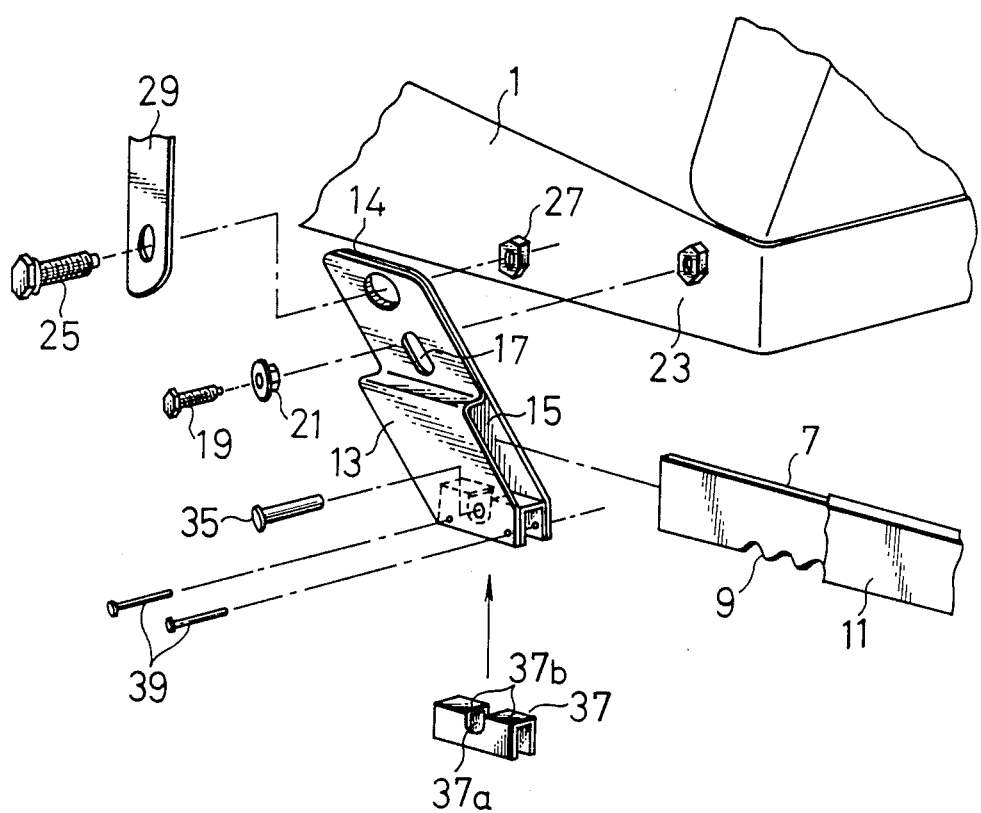
FIG. 2 is an exploded view of the seat belt anchor mechanism.

As shown in the exploded view of FIG. 2, a slot 17 is formed through a base plate 14 which is composed of two plates 13, 15. The slot 17 extends in a direction that crosses the sliding direction of the seat 1. A mounting bolt 19 extends through a spacer 21 and the slot 17 and is fastened to a tapped hole 23 in the seat 1, whereby the base plate 14 is mounted on the seat 1 displaceably along the length of the slot 17 and a lock pin 35, which will be described subsequently, is also displaceable in the longitudinal direction of the slot 17, namely, in the direction that crosses the sliding direction of the seat 1. A mounting means is composed by the slot 17 and mounting bolt 19 as described above.

To an upper end portion of the base plate 14, a buckle 29 is attached swingably by a bolt 25 and a nut 27. A tongue 33 fastened to a webbing 31 is releasably latched on the buckle 29.

The outer plate 13, which composes the base plate 14, includes a stepped portion. Below the stepped portion, the two plates 13,15 defines a spacing through which the anchor stay 7 extends.

In a lower end portion of the base plate 14, the lock pin 35 which is an interlocking means is fixed at a position opposite to the interlocking teeth 9 of the anchor stay 7. By a pair of rivets 39 as shear pins, a block 37 which is a cover member for the lock pin 35 is attached in the first position which the block 37 normally assumes. In the first position, at least a part of the block 37 is interposed between the anchor stay 7 and the lock pin 35 so as to prevent the lock pin 35 from engaging any one of the interlocking teeth 9. The lock pin 35 is covered by the block 37 in such a way that a substantially U-shaped notch 37a is formed in the block 37 and the lock pin 35 is received in the notch 37a. The upper wall of the block 37 except for the notch 37a is formed into flat surfaces 37b so that the flat surfaces 37b serve as guide surfaces when the base plate 14 moves together with the seat 1 along the anchor stay 7.

In the event of an emergency in which a tensile load of at least a predetermined value is applied to the base plate 14 from the webbing 31, the rivets 39 are sheared off so that the base plate 14 moves upwards without the block 37 and the lock pin 35 is exposed for engagement with any one of the interlocking teeth 9. Namely, the block 37 is attached to the base plate 14 in such a way that the block 37 can take the second position where said at least a part of the block 37 is retreated from the spacing between the anchor stay 7 and the lock pin 35 to allow the lock pin 35 to engage any one of the interlocking teeth 9.

Since the first embodiment has the above-described construction, the lock pin 35 is not exposed during the assembly work of the mechanism, and the assembly work is hence facilitated and the lock pin 35 and interlocking teeth 9 are maintained out of engagement without failure.

The operation of the first embodiment of the above-described construction will next be described.

During the non-emergency state, the base plate 14 is allowed to move along the anchor stay 7 when the seat 1 is slid. While tensile forces smaller than the above-mentioned predetermined value are only applied to the webbing 31, each load transmitted to the block 37 via the base plate 14 is borne by the rivets 39 so that the base plate 14 is maintained in the position fixed relative to the seat 1 and anchor stay 7. As a result, the buckle 29, namely, the webbing 31 is connected to the seat 1. Therefore, the occupant is restrained safely and comfortably by the webbing 31.

In the event of an emergency where a tensile load of at least a predetermined value is applied to the webbing 31, such as a vehicle collision, the load transmitted to the block 37 can no longer be borne by the rivets 39 so that the rivets 39 are sheared off. Accordingly, the base plate 14 and lock pin 35 move upwards without the block 37 and the lock pin 35 hence engages any one of the interlocking teeth 9. In the event of the emergency, the base plate 14 is connected to the side of the body of the vehicle via the anchor stay 7 as described above and the tensile force applied to the webbing is hence transmitted to the side of the body of the vehicle.

Figure 3:
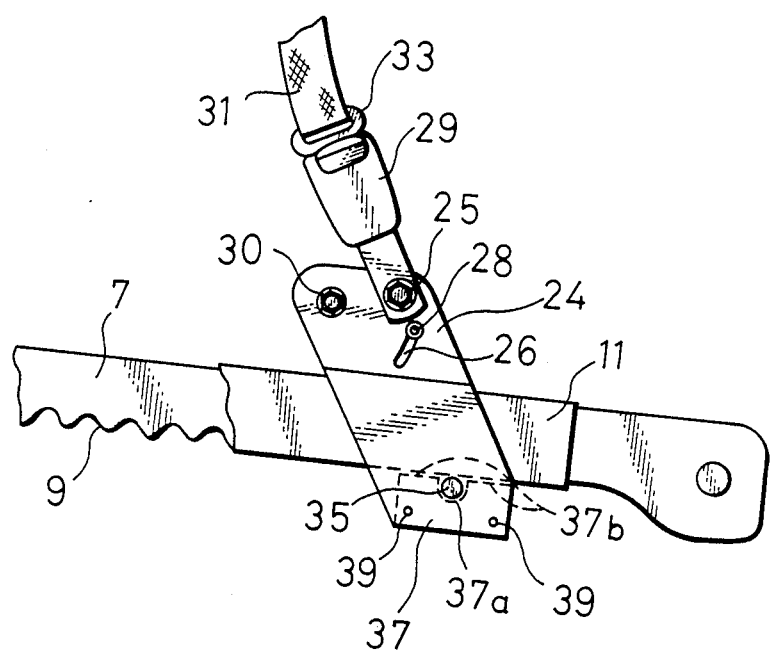
FIG. 3 is a front view of a seat belt anchor mechanism according to the second embodiment of this invention.

The second embodiment is shown in FIG. 3. In the second embodiment, an arcuate slot 26 is formed through a base plate 24 and a mounting bolt 28 extends through the slot 26 and is fastened on the seat 1. By another mounting bolt 30, the base plate 24 is positioned at the central point of the arcuate slot 26 relative to the seat 1. Thus, the base plate 24 is attached to the seat 1 turnably about said another mounting bolt 30. As described above, a mounting means is constructed by the arcuate slot 26, mounting bolt 28 and another mounting bolt 30.

The operation and the like of the second embodiment are substantially the same as those of the first embodiment.

In the above embodiments, the lock pin which is the interlocking means is covered by the cover member attached to the base plate by means of the shear pins. The manner of attachment of the cover member and the manner for releasing the cover member, namely, for bringing the cover member out of the first position to expose the interlocking means, namely, to bring the cover member to the second position may be changed in various ways. For example, the cover member may be attached to the interlocking means so that in the event of an emergency, the cover member is pressed against the anchor stay by a load applied from the interlocking means and the cover member is hence broken at an attachment portion thereof to the interlocking means so as to expose the interlocking means.

Having now fully described the invention, it will be apparent to one of ordinary skill in the art that many changes and modifications can be made thereto without departing from the spirit or scope of the invention as set forth herein.

What is claimed is:

1. A seat belt anchor mechanism for a vehicle having a body comprising:

an anchor stay defining a plurality of interlocking teeth and means to affix the anchor stay to a side of the body of the vehicle;

a base plate displaceable as unitary member together with an associated seat of the vehicle along the anchor stay when the associated seat is slid back and forth, said base plate being fastened to an associated occupant-restraining webbing;

an interlocking means fixed on the base plate for engagement with any one of the interlocking teeth in the event of an emergency;

means for mounting the base plate on the seat in such a way that the interlocking means is displaceable in a direction which crosses the sliding direction of the seat; and a cover member mounted on the base plate, said cover member during normal operation preventing the interlocking means from engaging said one of the interlocking teeth, said cover member having a first portion in which the interlocking means is received during normal operation and which opens in the direction of engagement of the interlocking means with any of the interlocking teeth, and an second portion interposed between the interlocking teeth and interlocking means, wherein said cover member is displaceable from the base plate to permit engagement between the interlocking means and any one of the interlocking teeth when a load of at least a predetermined value is applied to the base plate.

2. The seat belt anchor mechanism as claimed in claim 1, wherein the mounting means comprises a slot formed through the base plate and a mounting bolt which extends through the slot to be fastened to the seat.

3. The seat belt anchor mechanism as claimed in claim 1, wherein the mounting means comprises an arcuate slot formed through the base plate, a first mounting bolt which extends through the slot to be fastened to the seat, and a second mounting bolt which positions the base plate relative to the seat, whereby the base plate can be mounted on the seat turnably about the second mounting bolt.

4. The seat belt anchor mechanism as claimed in claim 1, wherein a portion of the anchor stay where the interlocking teeth are formed is covered by a thinwalled cover.

5. The seat belt anchor mechanism as claimed in claim 1, wherein said second portion of the cover member is formed as a guide surface extending in the direction of displacements of the base plate so that the cover member serves as a guide member with the seat along the anchor stay.

6. The seat belt anchor mechanism as claimed in claim 1, wherein the interlocking means is a lock pin.

7. A seat belt anchor mechanism for a vehicle having a body comprising:
an anchor stay defining a plurality of interlocking teeth and means to affix the anchor stay to a side of the body of the vehicle;
a base plate displaceable as a unitary member together with an associated seat of the vehicle along the anchor stay when the associated seat is slid back and forth, said base plate being fastened to an associated occupant-restraining webbing;
an interlocking means fixed on the base plate for engagement with any one of the interlocking teeth in the event of an emergency;
means for mounting the base plate on the seat in such a way that the interlocking means is displaceable in a direction which crosses the sliding direction of the seat; and
a cover member mounted on the base plate, said cover member during normal operation preventing the interlocking means from engaging said one of the interlocking teeth, said cover member having a first portion in which the interlocking means is received and which opens in the direction of engagement of the interlocking means with any of the interlocking teeth, and a second portion interposed between the interlocking teeth and interlocking means, wherein said cover member is displaceable from the base plate to permit engagement between the interlocking means and any one of the interlocking teeth when a load of at least a predetermined value is applied to the base plate;
wherein the cover member is attached to the base plate by means of a shear pin.

8. A seat belt anchor mechanism for a vehicle having a body comprising:
an anchor stay defining a plurality of interlocking teeth and means to affix the anchor stay to a side of the body of the vehicle;
a base plate displaceable as a unitary member together with an associated seat of the vehicle along the anchor stay when the associated seat is slid back and forth, said base plate being fastened to an associated occupant-restraining webbing;
an interlocking means fixed on the base plate for engagement with any one of the interlocking teeth in the event of an emergency;
means for mounting the base plate on the seat in such a way that the interlocking means is displaceable in a direction which crosses the sliding direction of the seat; and
a cover member mounted on the base plate, said cover member during normal operation preventing the interlocking means from engaging said one of the interlocking teeth, said cover member having a first portion in which the interlocking means is received and which opens in the direction of engagement of the interlocking means with any of the interlocking teeth, and a second portion interposed between the interlocking teeth and interlocking means, wherein said cover member is displaceable from the base plate to permit engagement between the interlocking means and any one of the interlocking teeth when a load of at least a predetermined value is applied to the base plate;
wherein said second portion of the cover member is formed as a guide surface extending in the direction of displacement of the base plate so that the cover member serves as a guide member for the base plate when the base plate moves together with the seat along the anchor stay, and said first portion is formed as a substantially U-shaped notch in the guide surface, said guide surface being continuous by way of the notch.

* * * * *